United States Patent [19]

Balinski et al.

[11] Patent Number: 4,513,658
[45] Date of Patent: Apr. 30, 1985

[54] CONTAINER FOR ACTIVATION OF MICROBIOPHYSICAL PROPERTIES OF SUBSTANCES ESPECIALLY FOOD-STUFFS

[75] Inventors: Ryszard Balinski; Marek Sokulski, both of Warsaw, Poland

[73] Assignee: Osrodek Badawczo-Rozwojowy Aparatury Mleczarskiej, Warsaw, Poland

[21] Appl. No.: 421,387

[22] Filed: Sep. 22, 1982

[30] Foreign Application Priority Data

Sep. 22, 1981 [PL] Poland ............................ 233126

[51] Int. Cl.³ ............................ A23B 4/00; A23B 7/00
[52] U.S. Cl. ................................ 99/485; 99/451; 99/467
[58] Field of Search ............... 99/467, 469, 472, 452, 99/453, 454, 451, 646 S; 426/106, 107, 110, 131

[56] References Cited

U.S. PATENT DOCUMENTS

| 971,987 | 10/1910 | Gibbon | 99/467 X |
| 1,911,879 | 5/1933 | Bohart | 99/451 X |

Primary Examiner—Timothy F. Simone
Attorney, Agent, or Firm—Ladas & Parry

[57] ABSTRACT

The invention relates to a container for activation of microbiophysical properties of substances, especially of food-stuffs. The container is a spatial form in a shape of a cylinder 1 with an open flank to which along the whole height at both sides two plates 2 earthed with conductors are fixed at a right angle, and opposite the open part of the cylinder 1 a movable plate 4 of the height of the cylinder 1 is situated, earthed with a conductor 5, whereby the whole form is founded on a plate 6 and closed with a cover.

2 Claims, 1 Drawing Figure

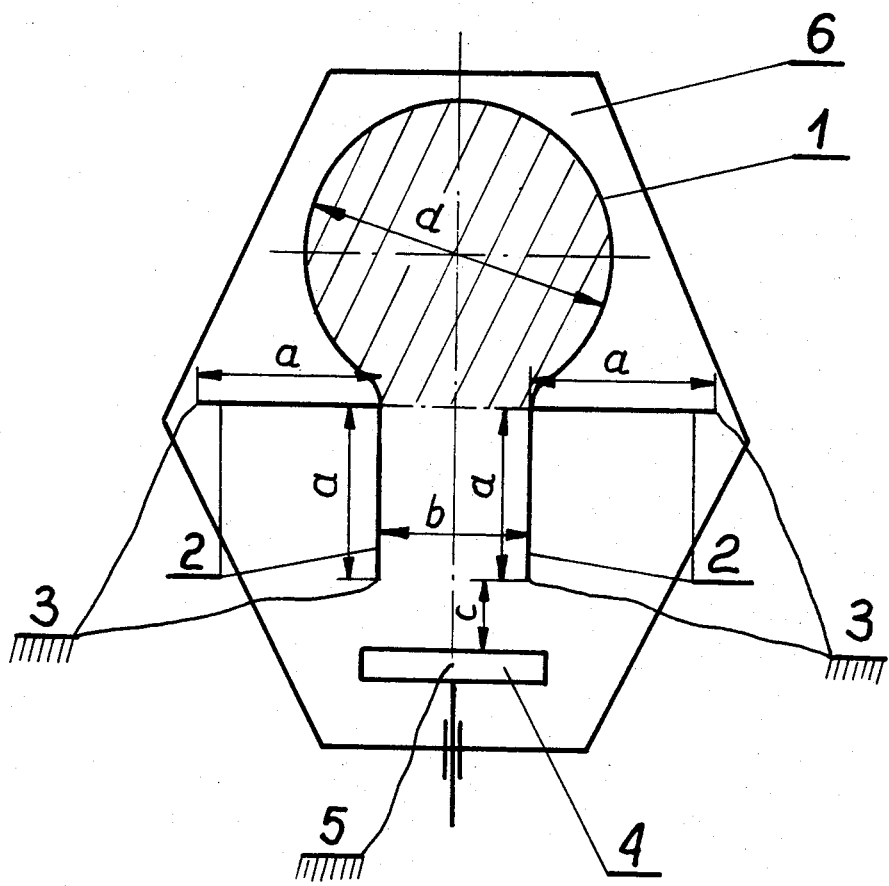

CONTAINER FOR ACTIVATION OF MICROBIOPHYSICAL PROPERTIES OF SUBSTANCES ESPECIALLY FOOD-STUFFS

The subject of the present invention is a container for activation of microbiophysical properties of substances, especially of food-stuffs. In result of applying various technological procedures and processes and during storage food-stuffs assigned for consumption undergo microbiophysical changes and are enriched with chemical agents acting negatively on humans. Elimination of these negative effects by the known methods as, for example, cooling, freezing, pasteurization, sterilization, acting on the substances with ultraviolet radiation, X-radiation and others, the application of chemical substances and compounds, is expensive, power-consuming and often impossible.

In technical literature, patent specifications, periodicals and other publications reports on works on an unconventional solution of these problems are more and more often met. One of these methods is, for example, attempts to utilize the effect of a geometrical form in a shape of a pyramid on a decrease of the development of bacteria *Eschericha coli*, an improvement of preservation of food-stuffs, an increase of the intensity of the growth of plants, etc.

According to the invention the container is formed in a shape of a cylinder with an open side to which along its whole height at both sides two plates are fixed at a right angle, whose ends are electrically grounded. Opposite the open part of the cylinder a movable plate is situated, which has the height of the cylinder, is earthed with a separate conductor and performs the function of blocking the operation of the device. The whole form is founded on a plate and provided with a cover. To perform its task, the container must preserve the following dimensional dependencies: the length of plates attached to the edges of the open side of the cylinder is equal or bigger from the width of the open part of the cylinder, the distance from the said plates to the movable plate performing the blocking function is smaller than the length of the plates attached to the side of the cylinder, and the ratio of the diameter of the cylinder to the length of the said plates is $\sqrt{2}$.

In the substance placed in the container according to the invention phenomena occur which cause activation and/or impediment of microbiophysical processes and/or lowering the activity of chemical agents negative for humans and impediment of the development of bacteria, fungi and negative microflora, and thus, impediment of deterioration processes of food-stuffs.

Substances placed in the container according to the invention, and especially water, improve their quality of taste and are better in consumption. Research has shown that, for example, vegetable fats subjected to the action of the container according to the invention has a slowed-down rate of becoming rancid and a decreased susceptibility to the release of free-radical processes, milk shows a decreased number of putrefactive bacteria, especially E coli, green plants change the energy level of photosynthesis processes.

The subject of the invention is shown in an example of its realisation in a drawing in a top view.

The container is a geometrical form made of sheet metal in a shape of a cylinder 1 whose side is open. To the open flank of the cylinder 1 along the whole height at both sides two plates 2 are fixed at a right angle, of a length a, made of the same sheet metal as the cylinder 1. The ends of plates 2 are electrically grounded with a conductor 3. Opposite the open side of the cylinder 1 of a width b a movable plate 4 is situated, electrically grounded with a conductor 5, performing the function of blocking the operation of the device. The plate 4 is made of sheet metal of the height of the cylinder 1 and has a possibility of movement in a direction perpendicular to the open side of the cylinder 1. The container performs its function if the following dimensional dependencies are preserved: the length a of plates $2 \leqq$ the width b of the open part of the cylinder 1, and the distance c of plates 2 from the plate 4 performing the function of blocking is smaller than the length a of plates 2 and the ratio of the diameter d of the cylinder 1 to the length a of plates 2 is equal to $\sqrt{2}$.

The whole geometrical form is mounted on a plate 6 in a form of a hexagon made of polystyrene or wood. From the top the container is closed with a cover made of polystyrene.

The container for activation of microbiophysical properties of substances functions if the axis of symmetry is set parallel to the north-south direction. The open part of the cylinder 1 is situated in the southern direction, the movable plate 4 does not close the ends of plates 2, and the whole form is electrically grounded.

The change of properties of a substance will occur if it is introduced into active volume limited by the cylinder 1 and remains therein for the period of at least 4 hours.

What is claimed is:

1. A container for activation of microbiophysical properties of a substance, especially food-stuffs and the like, comprising an upright cylinder mounted on a base and made of sheet metal, or the like, having a diameter (d) and a height, a portion of the side of the cylinder being open along the full height thereof, the width of said opening having a dimension (g), a pair of right angle plate member also formed of sheet metal or the like, and connected to the vertical edges defining said open side of said cylinder and arranged to be parallel to the vertical axis of said cylinder, each of said plates consisting of a pair of right angle flanges having a length of a dimension (a), and the remote edges thereof being electrically grounded, said plates being spaced apart by a dimension (b) corresponding to the side opening of said cylinder, a vertically arranged plate mounted on said base for radial movement toward and away from said cylinder and spaced from the edges of said right angle plate members by a distance (c), said movable plate also being electrically grounded, and a cover having a diameter (d) mounted above the top of said cylinder.

2. A container as defined in claim 1, wherein said length (a) of each said plate member is equal to or less than the width (b) of said opening in the side of said cylinder, the distance (c) of the movable plate from the ends of said plate members is less than said length (a) of said plate members, and the ratio of the diameter (d) of the cylinder to the length of said plate members (a) is numerically equal to the square root of two.

* * * * *